United States Patent
Sato

(10) Patent No.: US 9,631,656 B2
(45) Date of Patent: Apr. 25, 2017

(54) PIPE HOLDING DEVICE

(71) Applicant: HOSHINO GAKKI CO., LTD., Nagoya, Aichi (JP)

(72) Inventor: Naoki Sato, Nagoya (JP)

(73) Assignee: HOSHINO GAKKI CO., LTD., Nagoya (JP)

( * ) Notice: Subject to any disclaimer, the term of this patent is extended or adjusted under 35 U.S.C. 154(b) by 317 days.

(21) Appl. No.: 14/287,229

(22) Filed: May 27, 2014

(65) Prior Publication Data

US 2015/0240850 A1    Aug. 27, 2015

(30) Foreign Application Priority Data

Feb. 27, 2014    (JP) .................................. 2014-037272

(51) Int. Cl.
*F16B 7/14*    (2006.01)

(52) U.S. Cl.
CPC ..... *F16B 7/1418* (2013.01); *Y10T 403/32426* (2015.01)

(58) Field of Classification Search
CPC .......... F16B 7/1418; Y10T 403/32426; Y10T 403/69; Y10T 403/7062; Y10T 403/7077; H02G 3/32; H02G 3/30; H02G 3/0608; H02G 3/22; H02G 3/04
USPC ......... 403/104, 344, 373, 377; 248/65, 68.1, 248/73, 74.1, 74.4, 316.1, 316.2
See application file for complete search history.

(56) References Cited

U.S. PATENT DOCUMENTS

| 4,111,575 A | * | 9/1978 | Hoshino | F16B 7/1418 248/413 |
| 4,430,017 A | * | 2/1984 | Stefancich | F16B 7/1454 248/295.11 |
| 4,744,690 A | * | 5/1988 | Hsieh | F16B 7/1418 248/411 |
| 5,174,585 A | * | 12/1992 | Erkki | B23B 31/305 279/2.07 |

(Continued)

FOREIGN PATENT DOCUMENTS

| DE | 10257515 A1 | 7/2004 |
| JP | 48-96377 U | 11/1973 |

(Continued)

OTHER PUBLICATIONS

Japanese Office Action dated Feb. 16, 2016 issued in Japanese Patent Application No. 2014-037272.

*Primary Examiner* — Joshua J Michener
*Assistant Examiner* — Matthew Gitlin

(57) ABSTRACT

A pipe holding device includes a fixed clamp member, a movable clamp member, an upper ring and a lower ring. The fixed clamp member and the movable clamp member each have inner peripheral surfaces as metal surfaces coming into contact with the outer peripheral surface of the small diameter pipe. Furthermore, inner peripheral surfaces of cylindrical bodies correspond to a first resin surface and a second resin surface coming into contact with the outer peripheral surface of the small diameter pipe, respectively. The inner peripheral surface of the cylindrical body, the inner peripheral surfaces of the fixed clamp member and the movable clamp member, and the inner peripheral surface of the cylindrical body are adjacent to one another in an axial direction of a large diameter pipe.

14 Claims, 9 Drawing Sheets

(56) References Cited

U.S. PATENT DOCUMENTS

| | | | | |
|---|---|---|---|---|
| 6,155,743 | A | * 12/2000 | Chen | ............... F16B 7/1418 248/161 |
| 6,312,184 | B1 | 11/2001 | Hoshino | |
| 6,454,483 | B1 | * 9/2002 | Hoshino | ............ F16B 7/0413 248/188.5 |
| 7,381,876 | B2 | 6/2008 | Miyajima | |
| 2002/0028104 | A1 | * 3/2002 | Hoshino | ............ F16B 7/0413 403/109.5 |
| 2007/0068365 | A1 | 3/2007 | Miyajima | |
| 2011/0049868 | A1 | * 3/2011 | Mori | ................. F16B 2/10 285/188 |

FOREIGN PATENT DOCUMENTS

| | | |
|---|---|---|
| JP | 51-19706 U | 5/1976 |
| JP | 58-125711 U | 8/1983 |
| JP | 60-154698 U | 10/1985 |
| JP | 64-24315 U | 2/1989 |
| JP | 2001-159407 A | 6/2001 |
| JP | 2002-532666 A1 | 10/2002 |
| JP | 2007-079437 A | 3/2007 |
| JP | 3149714 U | 3/2009 |

\* cited by examiner

PIPE HOLDING DEVICE

BACKGROUND OF THE INVENTION

The present invention relates to a pipe holding device that fixes or slidably holds pipes having different diameters.

For example, Japanese Laid-Open Patent Publication No. 2007-79437, Japanese Laid-Open Patent Publication No. 2001-159407, and German Patent Application Publication No. 10,257,515 disclose a pipe holding device of this type. The pipe holding device disclosed in Japanese Laid-Open Patent Publication No. 2007-79437 holds an upper pipe on a lower pipe extending upward from a bass drum. The pipe holding device is provided with a clamp member made of metal, a bolt inserted into a hole of the clamp member, and a T-shaped nut screwed to the bolt. With this configuration, since the clamp member holds the upper pipe by tightening the T-shaped nut, the upper pipe is fixed to the lower pipe. Since holding of the upper pipe by the clamp member is released when loosening the T-shaped nut, the upper pipe can slide with respect to the lower pipe.

The pipe holding device disclosed in Japanese Laid-Open Patent Publication No. 2001-159407 is provided with a holding tool, a bushing made of resin housed in the holding tool, a bolt inserted through both holes of the holding tool and the bushing, and a T-shaped nut screwed to the bolt. With this configuration, when turning the T-shaped nut, since a washer presses end portions of the bushing and the bushing fastens a small diameter pipe, the small diameter pipe is fixed to a large diameter pipe. Since pressing of the bushing by the washer is released when loosening the T-shaped nut, the small diameter pipe can slide with respect to the large diameter pipe.

The pipe holding device disclosed in German Patent Application Publication No. 10,257,515 is provided with a clamp, a bushing made of resin and located inside the clamp, a bolt inserted through a hole of the clamp, and a T-shaped nut screwed to the bolt. With this configuration, when turning the T-shaped nut, since the clamp fastens the bushing from the outside and the bushing fastens a small diameter pipe, the small diameter pipe is fixed to a large diameter pipe. Since fastening of the bushing by the clamp is released when loosening the T-shaped nut, the small diameter pipe can slide with respect to the large diameter pipe.

As described above, the pipe holding device disclosed in Japanese Laid-Open Patent Publication No. 2007-79437 is configured to directly hold the upper pipe by the metal clamp. For this reason, it is possible to sufficiently ensure a fixing force for fixing the upper pipe to the lower pipe, by the rigid, metal clamp. However, since the metal clamp comes into direct contact with the upper pipe, an outer peripheral surface of the upper pipe may be damaged, or when allowing the upper pipe to slide, a harsh metallic sound may be produced. Meanwhile, the pipe holding devices disclosed in Japanese Laid-Open Patent Publication No. 2001-159407 and German Patent Application Publication No. 10,257,515 are configured to directly hold the small diameter pipe by the bushing made of resin. In this case, since the resin has self-lubricating properties, it is possible to allow the small diameter pipe to smoothly slide with respect to the large diameter pipe. However, since the rigidity of the resin bushing is smaller than that of the metal clamp, it is not possible to sufficiently ensure a fixing force for fixing the upper pipe to the lower pipe.

SUMMARY OF THE INVENTION

An object of the invention is to provide a pipe holding device that is able to sufficiently ensure a fixing force for fixing the small diameter pipe to the large diameter pipe, and improves operability when allowing the small diameter pipe to slide with respect to the large diameter pipe.

In order to solve the above-described problems, according to a first aspect of the invention, there is provided a pipe holding device that fixes or slidably holds pipes having different diameters. The pipe holding device is provided with a metallic member configured to hold a small diameter pipe on a large diameter pipe, and a resin member provided on the metallic member to hold the small diameter pipe together with the metallic member, the metallic member has a metal surface that contacts an outer peripheral surface of the small diameter pipe, the resin member has a resin surface that contacts the outer peripheral surface of the small diameter pipe, and the resin surface and the metal surface are adjacent to each other in an axial direction of the large diameter pipe.

DETAILED DESCRIPTION OF THE PREFERRED EMBODIMENTS

Hereinafter, an embodiment in which a pipe holding device 10 according to the invention is embodied will be described with reference to FIGS. 1 to 9.

Figure 1:
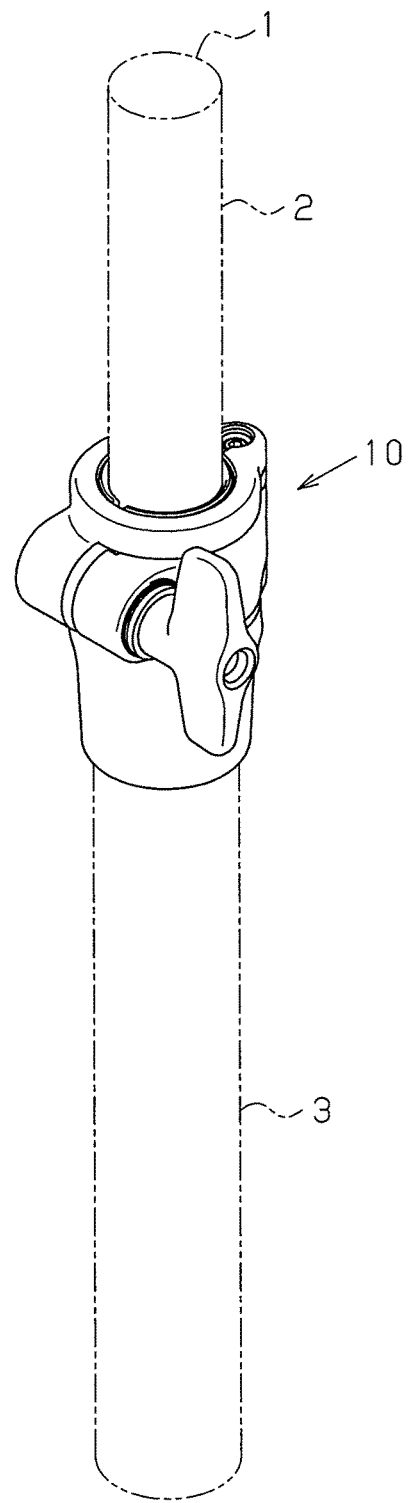
FIG. 1 is a perspective view of a pipe holding device of the invention.

As shown in FIG. 1, the pipe holding device 10 is attached to a column 1 of a stand for a musical instrument provided with a height adjustment function. The column 1 is made up of two pipes having different outer diameters. An upper pipe 2 as a small diameter pipe is inserted into a lower pipe 3 of a large diameter pipe. The pipe holding device 10 is fixed to an upper end of the lower pipe 3. The upper pipe 2 is fixed or slidably held with respect to the lower pipe 3 via the pipe holding device 10.

Figure 2:
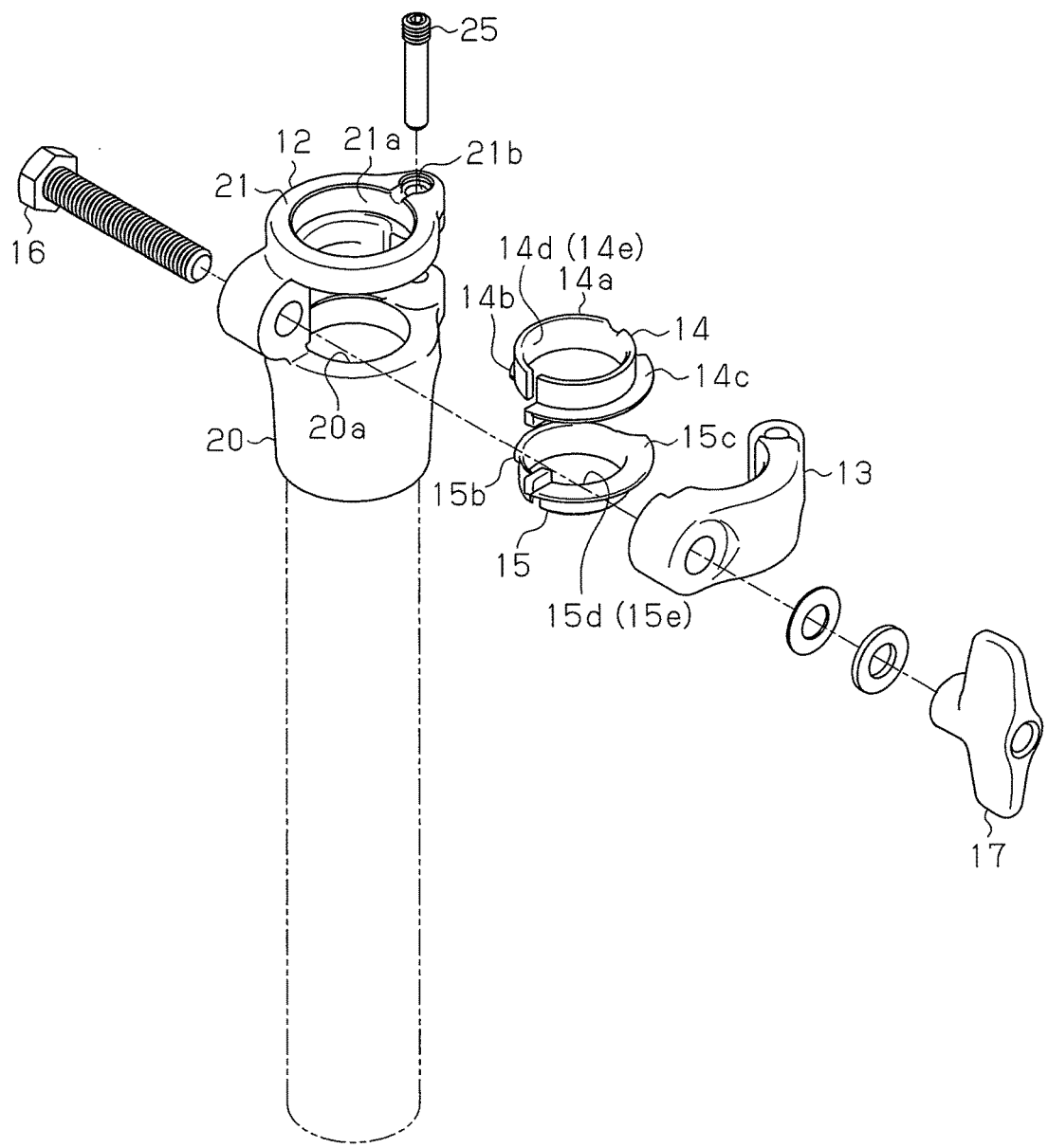
FIG. 2 is an exploded perspective view of the pipe holding device.

As shown in FIG. 2, the pipe holding device 10 is provided with a fixed clamp member 12 and a movable clamp member 13 as metallic members, a fastening member made up of a bolt 16 and a nut 17, and an upper ring 14 and a lower ring 15, which are resin members. The pipe holding device 10 is formed by assembling the fixed clamp member 12, the movable clamp member 13, the upper ring 14, and the lower ring 15, using the bolt 16 and the nut 17.

Furthermore, the upper ring 14 is a first resin member, and the lower ring 15 is a second resin member.

Figure 3:
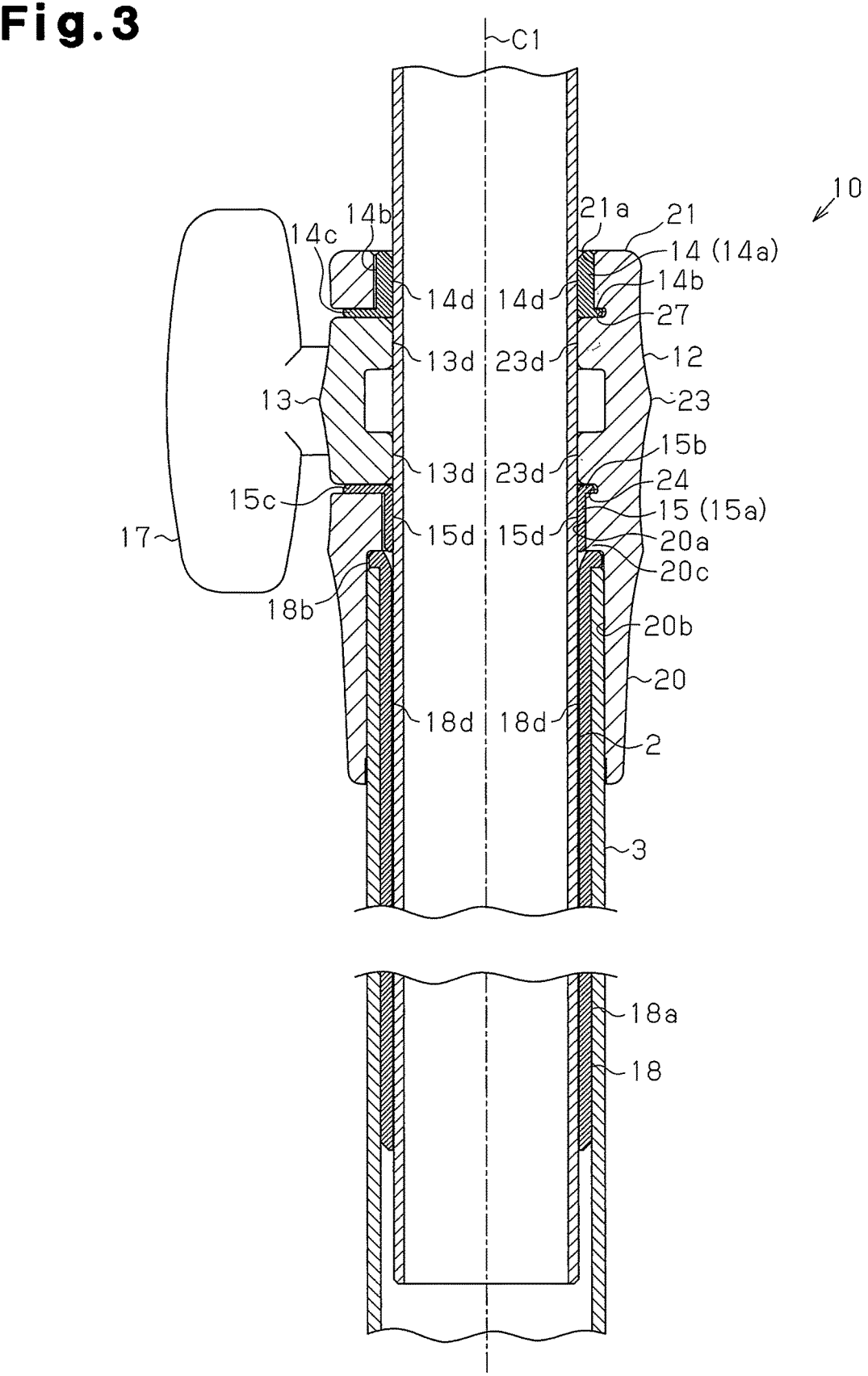
FIG. 3 is a longitudinal cross-sectional view of the pipe holding device in a state in which a movable clamp member is closed.

As shown in FIGS. 2 and 3, the fixed clamp member 12 is provided with a cylindrical base portion 20 to which an outer peripheral surface of the lower ring 15 is fitted, a annular portion 21 to which an outer peripheral surface of the upper ring 14 is fitted, and a holding portion 23 provided between the base portion 20 and the annular portion 21. The fixed clamp member 12 holds the small diameter pipe 2 together with the movable clamp member 13. The base portion 20 is coaxial with the annular portion 21.

The base portion 20 has a lower fitting hole 20a to which the outer peripheral surface of the lower ring 15 is fitted, and a fixing hole 20b to which a leading end of the large diameter pipe 3 is fixed. In the fixing hole 20b, a guide member 18 is located between the large diameter pipe 3 and the small diameter pipe 2. The guide member 18 has a cylindrical portion 18a, and an enlarged diameter portion 18b on the upper end of the cylindrical portion 18a. The enlarged diameter portion 18b is engaged with an opening end of the large diameter pipe 3.

The lower fitting hole 20a is coaxial with the fixing hole 20b and is in communication with the fixing hole 20b. Furthermore, a diameter of the lower fitting hole 20a is smaller than a diameter of the fixing hole 20b. For this reason, a step 20c is formed at a boundary portion between the lower fitting hole 20a and the fixing hole 20b. A groove 24 is provided between the base portion 20 and the holding portion 23. The groove 24 is provided on a side opposite to the movable clamp member 13. The groove 24 extends along the inner peripheral surface of the lower fitting hole 20a.

Figure 4:
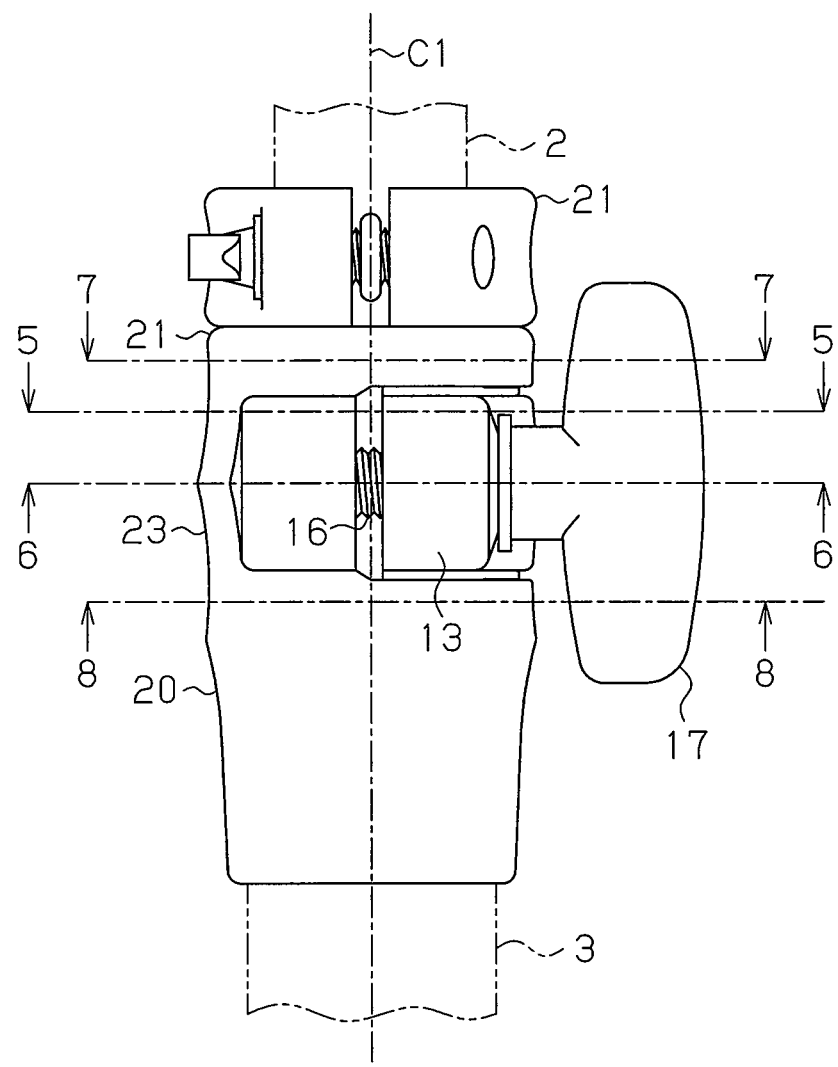
FIG. 4 is a side view of the pipe holding device.
Figure 5:
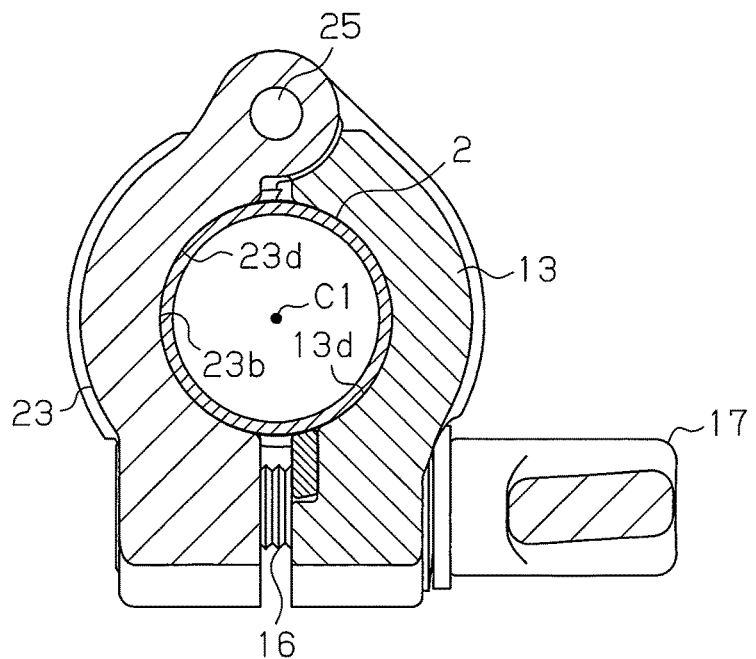
FIG. 5 is a cross-sectional view along line 5-5 of FIG. 4.
Figure 6:
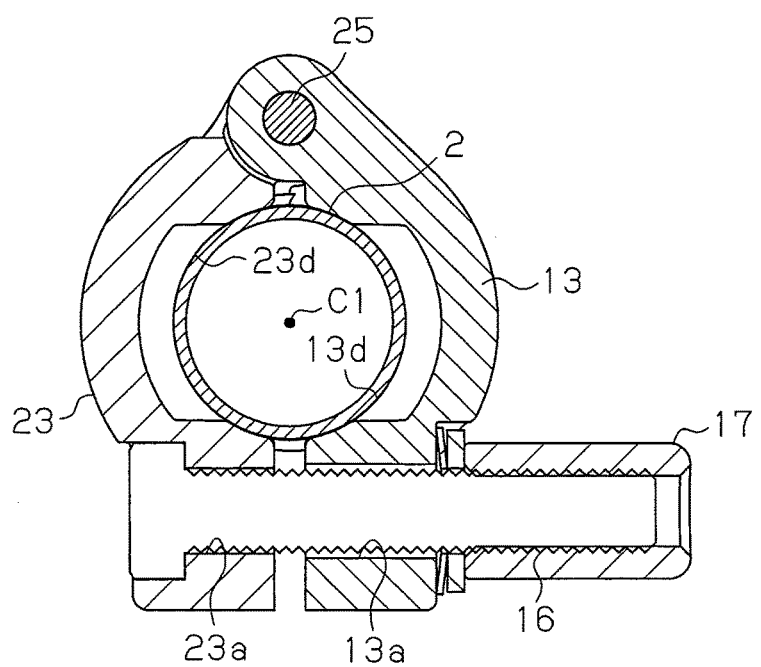
FIG. 6 is a cross-sectional view along line 6-6 of FIG. 4.

As shown in FIGS. 4 to 6, the holding portion 23 has a shape that is substantially symmetrical to the movable clamp member 13 with respect to an axis C1 of the fixed clamp member 12. A proximal end of the movable clamp member 13 is pivotally connected to one side portion of the holding portion 23 via a connecting pin 25. In the other side portion of the holding portion 23, an insertion hole 23a into which the bolt 16 is inserted is formed. Furthermore, at a leading end of the movable clamp member 13, an insertion hole 13a into which the bolt 16 is inserted is also formed. By fastening the nut 17 to the bolt 16 inserted through the both insertion holes 23a and 13a, the leading end of the movable clamp member 13 is fixed to the holding portion 23. Thus, since the fixed clamp member 12 and the movable clamp member 13 grip the small diameter pipe 2 therebetween, the small diameter pipe 2 is held so as not to move with respect to the large diameter pipe 3. That is, the small diameter pipe 2 is fixed to the large diameter pipe 3 via the pipe holding device 10.

The holding portion 23 has an inner peripheral surface 23d, which is a metal surface, coming into contact with an outer peripheral surface of the small diameter pipe 2. The movable clamp member 13 also has an inner peripheral surface 13d, which is a metal surface, coming into contact with the outer peripheral surface of the small diameter pipe 2. Both inner peripheral surfaces 23d and 13d are arcuate surfaces centered on the axis C1 of the fixed clamp member 12. Both inner peripheral surfaces 23d and 13d form a holding hole 23b for holding the small diameter pipe 2. The holding hole 23b extends along the axis C1 of the fixed clamp member 12.

As shown in FIGS. 2 and 3, the annular portion 21 has an upper fitting hole 21a to which the outer peripheral surface of the upper ring 14 is fitted, and an insertion hole 21b into which the connecting pin 25 is inserted. A groove 27 is provided between the annular portion 21 and the holding portion 23. The groove 27 is provided on a side opposite to the movable clamp member 13. The groove 27 extends along an inner peripheral surface of the upper fitting hole 21a.

The upper ring 14 is provided with a cylindrical body 14a fitted into the upper fitting hole 21a. At a proximal end of the cylindrical body 14a, a protruding portion 14b and a flange 14c are formed. The protruding portion 14b and the flange 14c protrude outward from the outer peripheral surface of the cylindrical body 14a, respectively. The flange 14c is provided on a side opposite to the protruding portion 14b with respect to the center of the cylindrical body 14a. The upper ring 14 is mounted into the upper fitting hole 21a of the annular portion 21 in a state in which a leading end of the cylindrical body 14a faces upward. In this state, the protruding portion 14b is engaged with the groove 27 of the fixed clamp member 12, and the flange 14c is located between the lower end surface of the annular portion 21 and the upper end surface of the movable clamp member 13.

The lower ring 15 is provided with a cylindrical body 15a fitted to the lower fitting hole 20a. At the proximal end of the cylindrical body 15a, a protruding portion 15b and a flange 15c are formed. The protruding portion 15b and the flange 15c protrude outward from the outer peripheral surface of the cylindrical body 15a, respectively. The flange 15c is provided on a side opposite to the protruding portion 15b with respect to the center of the cylindrical body 15a. The lower ring 15 is mounted to the lower fitting hole 20a of the base portion 20 in a state in which the leading end of the cylindrical body 15a faces downward. In this state, the protruding portion 15b is engaged with the groove 24 of the fixed clamp member 12, and the flange 15c is located between the lower end surface of the movable clamp member 13 and the upper end surface of the base portion 20. The lower ring 15 has a shape that is substantially symmetrical to the upper ring 14.

The upper ring 14, the lower ring 15, and the guide member 18 are formed of the resin material of the same kind. As the resin material, materials having high strength and wear resistance and having excellent moldability and self-lubricating properties are used, and specifically, nylon, polyacetal, or the like is used. The thickness of the cylindrical body 14a is set to be greater than the thickness of the cylindrical body 15a. Furthermore, the thickness of the cylindrical portion 18a is set to be greater than the thickness of the cylindrical body 15a and smaller than the thickness of the cylindrical body 14a.

Figure 7:
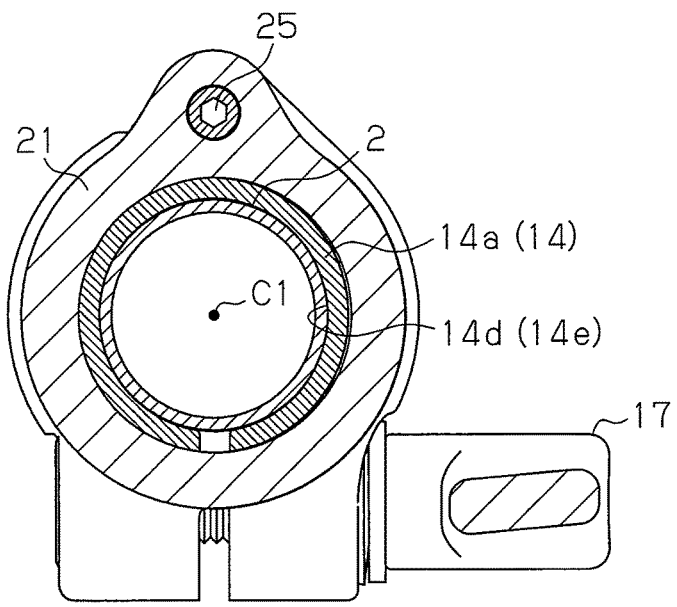
FIG. 7 is a cross-sectional view along line 7-7 of FIG. 4.
Figure 8:
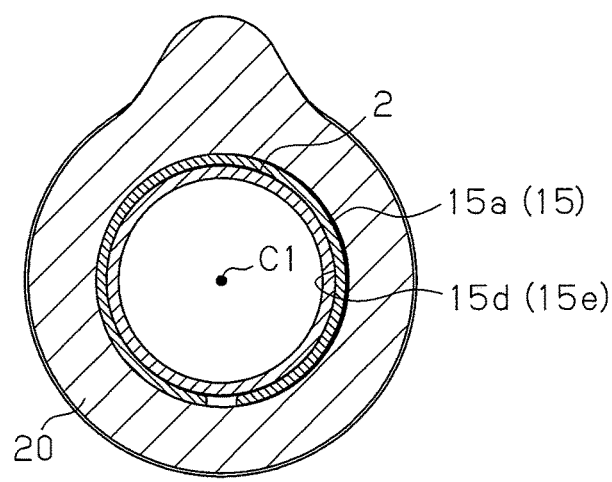
FIG. 8 is a cross-sectional view along line 8-8 of FIG. 4.

As shown in FIGS. 4, 7 and 8, the upper ring 14 has a holding hole 14e that holds the small diameter pipe 2 on the inside of the cylindrical body 14a. The inner peripheral surface 14d of the cylindrical body 14a is a first resin surface that comes into contact with the outer peripheral surface of the small diameter pipe 2. The lower ring 15 also has a holding hole 15e that holds the small diameter pipe 2 on the inside of the cylindrical body 15a. The inner peripheral surface 15d of the cylindrical body 15a is a second resin surface that comes into contact with the outer peripheral surface of the small diameter pipe 2.

Next, the operation of the above-described pipe holding device 10 will be described.

First, a state in which the small diameter pipe 2 is fixed to the large diameter pipe 3 by the pipe holding device 10 will be described.

As shown in FIG. 3, the upper ring 14 is located so that both inner peripheral surfaces 23d and 13d of the clamp members 12 and 13 are between the inner peripheral surface 14d of the cylindrical body 14a and the leading end of the large diameter pipe 3. The lower ring 15 is located so that the inner peripheral surface 15d of the cylindrical body 15a is between the inner peripheral surfaces 23d and 13d of the clamp members 12 and 13 and the leading end of the large diameter pipe 3. The guide member 18 is located so that the inner peripheral surface 15d of the cylindrical body 15a is between the inner peripheral surface 18d of the cylindrical portion 18a and the inner peripheral surfaces 23d and 13d of the clamp members 12 and 13.

The inner diameter of the cylindrical body 14a is set to be the same as the diameter of the holding hole 23b, which is defined by the inner peripheral surfaces 23d and 13d, the inner diameter of the cylindrical body 15a, and the inner diameter of the cylindrical portion 18a. Furthermore, the cylindrical body 14a is coaxial with the holding hole 23b, the cylindrical body 15a, and the cylindrical portion 18a. For this reason, the inner peripheral surface 14d of the cylindrical body 14a, the inner peripheral surfaces 23d and 13d of the clamp members 12 and 13, the inner peripheral surface 15d of the cylindrical body 15a, and the inner peripheral surface 18d of the cylindrical portion 18a are adjacent to one another in the axial direction of the large diameter pipe 3, in the following order: the inner peripheral surface 14d, the inner peripheral surfaces 23d and 13d, the inner peripheral surface 15d, and the inner peripheral surface 18d. Furthermore, the inner peripheral surface 14d of the cylindrical body 14a, the inner peripheral surfaces 23d and 13d of the clamp members 12 and 13, the inner peripheral surface 15d of the cylindrical body 15a, and the inner peripheral surface 18d of the cylindrical portion 18a are located on the same cylindrical surface.

In this state, the outer peripheral surface of the small diameter pipe 2 is held by the fixed clamp member 12 and the movable clamp member 13 and by the upper ring 14 and the lower ring 15. The inner peripheral surface 14d of the cylindrical body 14a and the inner peripheral surface 15d of the cylindrical body 15a are resin surfaces, and the inner peripheral surfaces 23d and 13d of the clamp members 12 and 13 are metal surfaces. Metal is harder than resin, and has higher rigidity. In this case, the small diameter pipe 2 is directly held by the inner peripheral surfaces 23d and 13d of the clamp members 12 and 13, which have higher rigidity. For this reason, the fixing force for fixing the small diameter pipe 2 to the large diameter pipe 3 is sufficiently ensured by the pipe holding device 10. Further, since the inner peripheral surface 14d of the cylindrical body 14a, the inner peripheral surfaces 23d and 13d of the clamp members 12 and 13, and the inner peripheral surface 15d of the cylindrical body 15a are located on the same cylindrical surface, substantially uniform holding force is applied to the outer peripheral surface of the small diameter pipe 2 held by the pipe holding device 10.

Next, a state in which fixing of the small diameter pipe 2 due to the pipe holding device 10 is released will be described.

Figure 9:
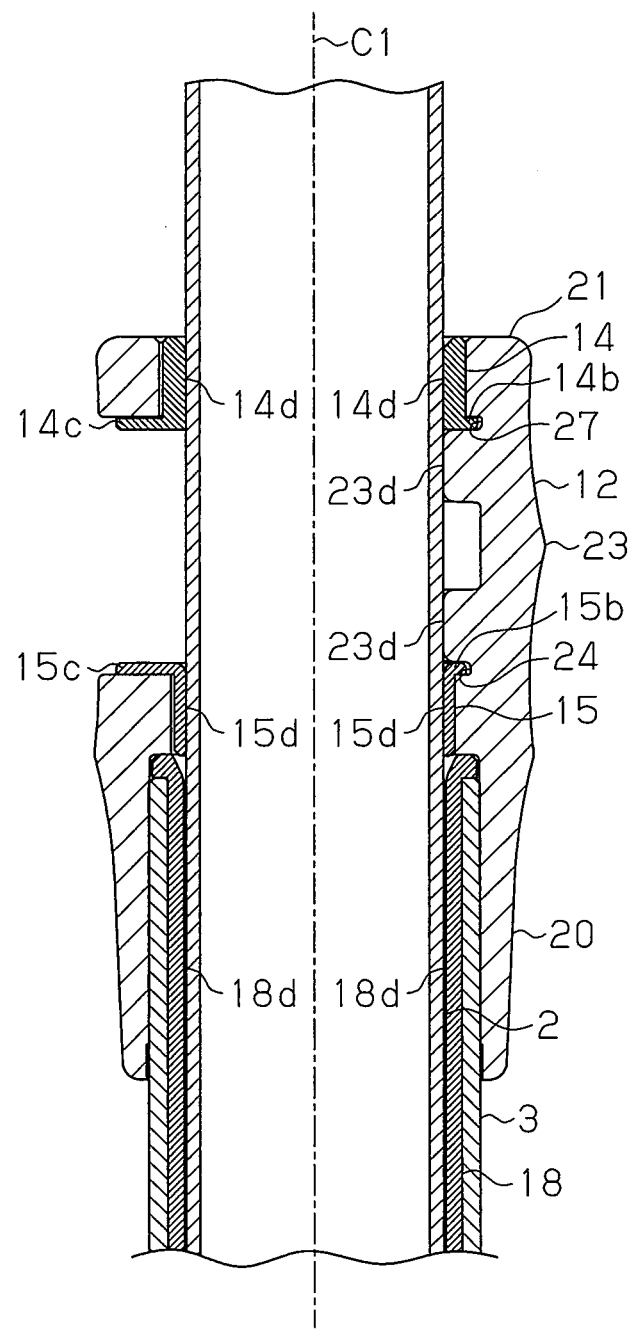
FIG. 9 is a longitudinal cross-sectional view of the pipe holding device in a state in which the movable clamp member is opened.

As shown in FIG. 9, by releasing the holding of the small diameter pipe 2 by the fixed clamp member 12 and the movable clamp member 13, the small diameter pipe 2 is held by the inner peripheral surfaces 14d and 15d of the cylindrical bodies 14a and 15a and the inner peripheral surface 18d of the cylindrical portion 18a. Resin is softer than metal and has self-lubricating properties. In this case, the small diameter pipe 2 can slide on the inner peripheral surfaces 14d and 15d of the cylindrical bodies 14a and 15a and the inner peripheral surface 18d of the cylindrical portion 18a, which have self-lubricating properties.

In this case, the protruding portion 14b is engaged with the groove 27 of the fixed clamp member 12, and the flange 14c is in contact with the lower end surface of the annular portion 21. Further, the protruding portion 15b is engaged with the groove 24 of the fixed clamp member 12, and the flange 15c is in contact with the upper end surface of the base portion 20. For this reason, even when the small diameter pipe 2 is caused to slide up and down with respect to the large diameter pipe 3 (caused to telescope), the upper ring 14 is held to prevent its escape from the annular portion 21, by the protruding portion 14b and the flange 14c. Furthermore, the lower ring 15 is also held to prevent its escape from the base portion 20, by the protruding portion 15b and the flange 15c.

Therefore, according to this exemplary embodiment, it is possible to obtain the following effects.

(1) The pipe holding device 10 is provided with the fixed clamp member 12 and the movable clamp member 13, and the upper ring 14 and the lower ring 15. The fixed clamp member 12 and the movable clamp member 13 each have inner peripheral surfaces 23d and 13d as metal surfaces that come into contact with the outer peripheral surface of the small diameter pipe 2. Further, the inner peripheral surfaces 14d and 15d of the cylindrical bodies 14a and 15a correspond to a first resin surface and a second resin surface coming into contact with the outer peripheral surface of the small diameter pipe 2, respectively. The inner peripheral surface 14d of the cylindrical body 14a, the inner peripheral surfaces 23d and 13d of the clamp members 12 and 13, and the inner peripheral surface 15d of the cylindrical body 15a are adjacent to one another in the axial direction of the large diameter pipe 3.

With this configuration, when fixing the small diameter pipe 2 to the large diameter pipe 3, it is possible to hold the outer peripheral surface of the small diameter pipe 2 by the clamp members 12 and 13 and the rings 14 and 15. In this case, since the small diameter pipe 2 is directly held by the metal surface having the rigidity, it is possible to sufficiently ensure a fixing force for fixing the small diameter pipe 2 to the large diameter pipe 3. When releasing the fixation of the small diameter pipe 2 to the large diameter pipe 3, since the holding of the small diameter pipe 2 by the clamp members 12 and 13 is released, it is possible to hold the small diameter pipe 2 only by the resin surface of the rings 14 and 15. In this case, it is possible to allow the small diameter pipe 2 to smoothly slide along the resin surface, which has self-lubricating properties. Thus, the operability when allowing the small diameter pipe 2 to slide with respect to the large diameter pipe 3 is improved. Furthermore, since the clamp members 12 and 13 do not directly come into contact with the small diameter pipe 2, the outer peripheral surface of the small diameter pipe 2 is not damaged, and a the harsh metallic sound is not generated when sliding the small diameter pipe 2.

(2) The upper ring 14 is located so that inner peripheral surfaces 23d and 13d of the clamp members 12 and 13 are between the inner peripheral surface 14d of the cylindrical body 14a and the leading end of the large diameter pipe 3. Furthermore, the lower ring 15 is located so that the inner peripheral surface 15d of the cylindrical body 15a is between the inner peripheral surfaces 23d and 13d of the clamp members 12 and 13 and the leading end of the large diameter pipe 3. With this configuration, it is possible to allow the inner peripheral surfaces 14d and 15d of the rings 14 and 15, which are resin surfaces, to adjoin both sides (opposite sides) of the inner peripheral surfaces 23d and 13d of the clamp members 12 and 13, which are metal surfaces.

Thus, the posture of the small diameter pipe 2 fixed to the large diameter pipe 3 is further stabilized. Furthermore, since it is possible to suppress the fluctuation of the small diameter pipe 2 with respect to the large diameter pipe 3, the operability when allowing the small diameter pipe 2 to slide with respect to the large diameter pipe 3 is further improved.

(3) The inner peripheral surface 14d of the cylindrical body 14a, the inner peripheral surfaces 23d and 13d of the clamp members 12 and 13, the inner peripheral surface 15d of the cylindrical body 15a, and the inner peripheral surface 18d of the cylindrical portion 18a are located on the same cylindrical surface. With this configuration, it is possible to improve the holding force of the small diameter pipe 2 due to the clamp members 12 and 13 and the rings 14 and 15. Therefore, it is possible to further increase the fixing force for fixing the small diameter pipe 2 to the large diameter pipe 3.

(4) The fixed clamp member 12 is provided with the cylindrical base portion 20 to which the outer peripheral surface of the lower ring 15 is fitted, and the annular portion 21 to which the outer peripheral surface of the upper ring 14 is fitted. With this configuration, by fitting the lower ring 15 and the upper ring 14 to each of the base portion 20 and the annular portion 21, when releasing the fixing of the small diameter pipe 2 with respect to the large diameter pipe 3, it is possible to maintain a constant internal diameter of both rings 14 and 15. In this case, since the constant contact pressure of both rings 14 and 15 with respect to the outer peripheral surface of the small diameter pipe 2 is kept, it is possible to allow the small diameter pipe 2 to smoothly slide along the inner peripheral surfaces 14d and 15d of both rings 14 and 15. Thus, the operability when allowing the small diameter pipe 2 to slide with respect to large diameter pipe 3 is further improved.

(5) Since the leading end of the movable clamp member 13 is fixed to the holding portion 23 by fastening the nut 17 to the bolt 16 inserted into both insertion holes 23a and 13a, the fixed clamp member 12 and the movable clamp member 13 grip the small diameter pipe 2. With this configuration, the fastening force of the fastening member is applied to the entire outer peripheral surface of the small diameter pipe 2. Thus, the holding force of the small diameter pipe 2 due to the clamp members 12 and 13 and the rings 14 and 15 is further improved, and it is possible to further increase the fixing force for fixing the small diameter pipe 2 to the large diameter pipe 3.

(6) The upper ring 14 is provided with the cylindrical body 14a fitted to the upper fitting hole 21a. The protruding portion 14b is formed at the proximal end of the cylindrical body 14a. The protruding portion 14b is engaged with the groove 27 of the fixed clamp member 12. With this configuration, it is difficult for the upper ring 14 to fall out of the fixed clamp member 12. Similarly, it is difficult for the lower ring 15 to fall out of the fixed clamp member 12, by engaging the protruding portion 15b with the groove 24 of the fixed clamp member 12.

(7) In the state of releasing the holding of the small diameter pipe 2 due to the fixed clamp member 12 and the movable clamp member 13, the protruding portion 14b is engaged with the groove 27 of the fixed clamp member 12, and the flange 14c is in contact with the lower end surface of the annular portion 21. In addition, the protruding portion 15b is engaged with the groove 24 of the fixed clamp member 12, and the flange 15c is in contact with the upper end surface of the base portion 20. With this configuration, it is more difficult for each of the upper ring 14 and the lower ring 15 to fall out of the fixed clamp member 12.

(8) The flanges 14c and 15c are formed at the proximal ends of the cylindrical bodies 14a and 15a, respectively. In the state of fixing the small diameter pipe 2 to the large diameter pipe 3 by the pipe holding device 10, the flange 14c is located between the lower end surface of the annular portion 21 and the upper end surface of the movable clamp member 13. Furthermore, the flange 15c is located between the lower end surface of the movable clamp member 13 and the upper end surface of the base portion 20. With this configuration, it is possible to reliably hold both rings 14 and 15 within the clamp members 12 and 13.

(9) The guide member 18 is located between the large diameter pipe 3 and the small diameter pipe 2. With this configuration, the posture of the small diameter pipe 2 fixed to the large diameter pipe 3 is further stabilized. Further, since the fluctuation of the small diameter pipe 2 with respect to the large diameter pipe 3 is also suppressed, the operability when allowing the small diameter pipe 2 to slide with respect to large diameter pipe 3 is further improved.

In addition, this exemplary embodiment may be modified as follows.

Figure 10:
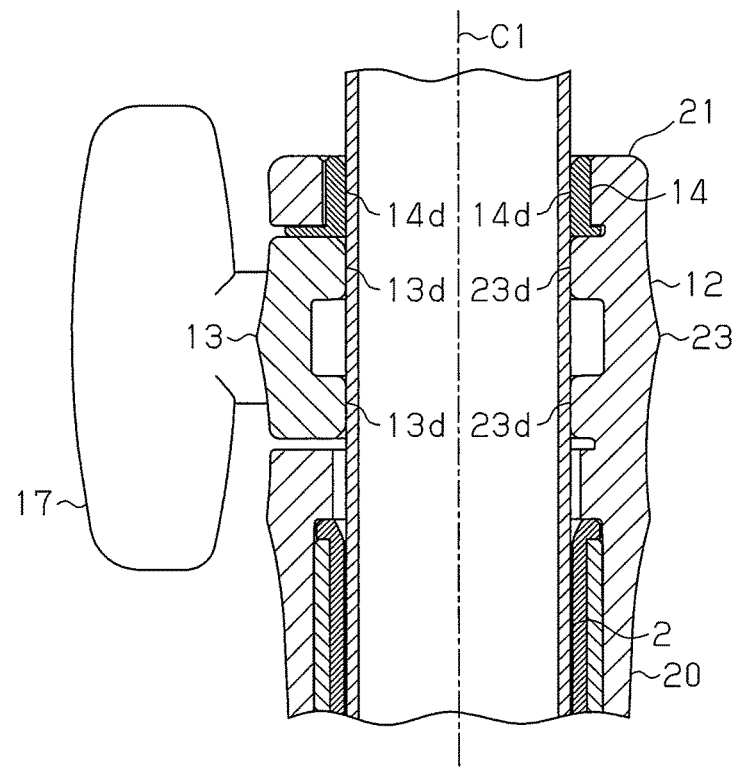
FIG. 10 is a cross-sectional view illustrating a pipe holding device of another example.

In this exemplary embodiment, as illustrated in FIG. 10, the lower ring 15 may be excluded from the pipe holding device 10. Even in this configuration, as compared to the case of providing the ring as the resin member between the metal surfaces of the clamp members 12 and 13 and the leading end of the large diameter pipe 3, the posture of the small diameter pipe 2 fixed to the large diameter pipe 3 is further stabilized.

Figure 11:
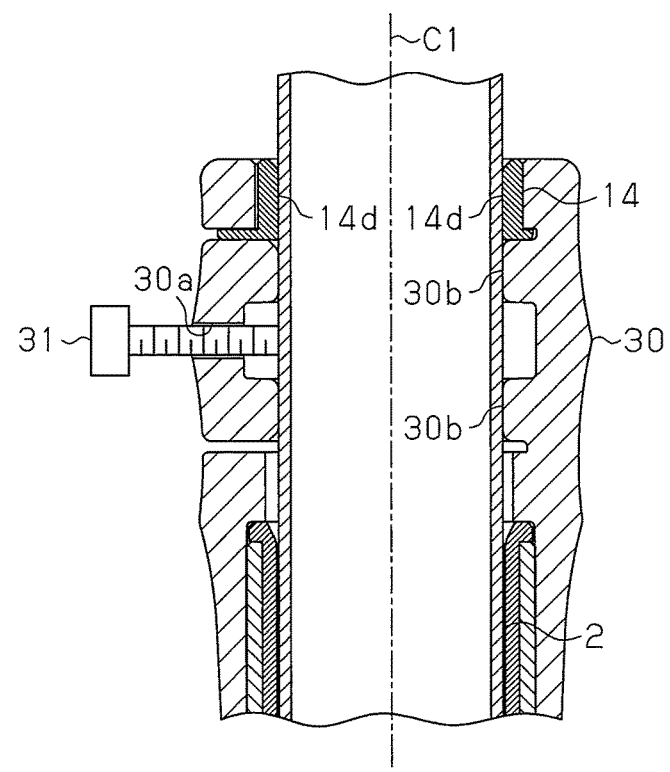
FIG. 11 is a cross-sectional view illustrating a pipe holding device of another example.

In this exemplary embodiment, as shown in FIG. 11, a screw hole 30a may be formed in the cylindrical metallic member 30 fixed to the large diameter pipe 3, thereby fastening the bolt 31 screwed into the screw hole 30a. In this case, the small diameter pipe 2 is pressed against the inner wall surface 30b of the metallic member 30 and fixed by the leading end of the bolt 31.

Figure 12:
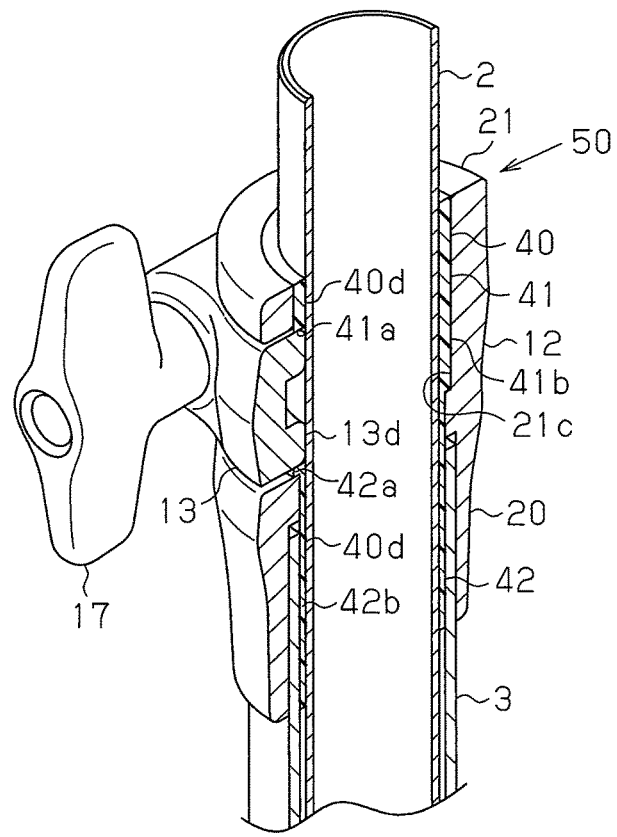
FIG. 12 is a partial perspective view illustrating a pipe holding device of another example.
Figure 13:
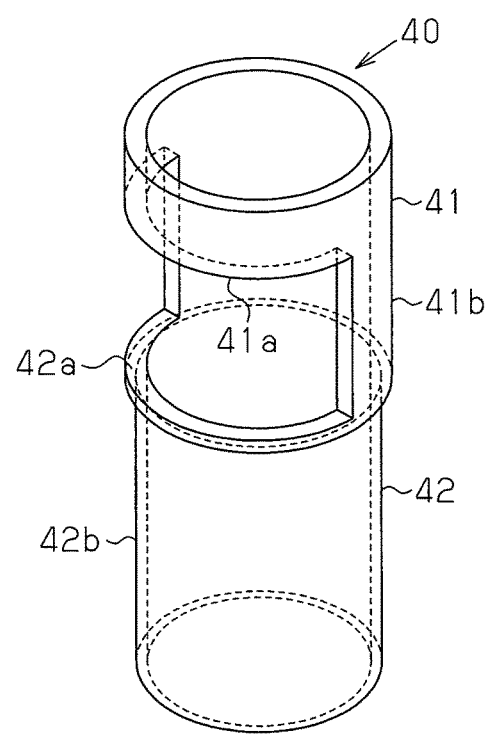
FIG. 13 is a perspective view illustrating a resin member of another example.

In this exemplary embodiment, the upper ring 14 and the lower ring 15 were used as the resin member, but a resin member 40 constituted by integrating the upper ring, the lower ring, and the guide member of the first embodiment may be used. For example, as illustrated in FIGS. 12 and 13, the resin member 40 has an upper annular portion 41 fitted to the annular portion 21 of the fixed clamp member 12, and a lower annular portion 42 fitted to the base portion 20 of the fixed clamp member 12. The resin member 40 is formed as a cylindrical body having an axis. The upper annular portion 41 has an opening 41a at the position where the movable clamp member 13 is located. The upper annular portion 41 has a protruding portion 41b that protrudes in a direction perpendicular to the axis of the resin member 40 from the outer peripheral surface of the lower annular portion 42. In the annular portion 21 of the fixed clamp member 12, a recess portion 21c as an engaging groove engaged with the protruding portion 41b is formed.

The lower annular portion 42 has a flange portion 42a and a cylindrical guide portion 42b. The flange portion 42a is located on a side opposite to the protruding portion 41b of the upper annular portion 41 with respect to the axis of the resin member 40. The flange portion 42a is located between the lower end surface of the movable clamp member 13 and the upper end surface of the base portion 20. The guide portion 42b is located between the inner peripheral surface of the large diameter pipe 3 and the outer peripheral surface of the small diameter pipe 2. The resin member 40 is located to allow the resin surface 40d to adjoin both sides of the inner peripheral surface 13d of the movable clamp member 13, which is a the metal surface.

With this configuration, since the movable clamp member 13 and the resin member 40 grip the small diameter pipe 2 therebetween by fastening the nut 17, the small diameter pipe 2 is held so as not to move with respect to the large diameter pipe 3. Furthermore, according to the pipe holding device 50, the resin member 40 has the cylindrical guide portion 42b located between the inner peripheral surface of the large diameter pipe 3 and the outer peripheral surface of the small diameter pipe 2. For this reason, the posture of the small diameter pipe 2 fixed to the large diameter pipe 3 is further stabilized. Further, since the fluctuation of the small diameter pipe 2 with respect to the large diameter pipe 3 is also suppressed, the operability when allowing the small diameter pipe 2 to slide with respect to the large diameter pipe 3 is further improved.

In this exemplary embodiment, the flanges 14c and 15c may be excluded from the upper ring 14 and the lower ring 15, respectively.

In this exemplary embodiment, the guide member 18 located between the large diameter pipe 3 and the small diameter pipe 2 may be excluded.

In this exemplary embodiment, as the upper ring 14 and the lower ring 15, a ring in which a surface of substrate is coated with fluorine resin may be used.

In this exemplary embodiment, the pipe holding device 10 may also be applied to a microphone stand having a height adjustment function or a horizontal bar having a length adjustment function, in addition to the stands for musical instrument.

The invention claimed is:

1. A pipe holding device that holds pipes having different diameters, wherein the holding device holds the pipes to fix the position of the pipes with respect to one another or to permit one of the pipes to slide with respect to the other, and the pipe holding device comprises:
 a metallic member configured to hold a small diameter pipe with respect to a large diameter pipe; and
 a resin member provided on the metallic member to hold the small diameter pipe together with the metallic member,
 wherein the resin member has a resin surface that contacts an outer peripheral surface of the small diameter pipe,
 the metallic member includes a first member and a second member,
 the first and second members have metal surfaces, respectively, that are adapted to contact the outer peripheral surface of the small diameter pipe,
 the resin surface and the metal surfaces are adjacent to each other in an axial direction of the large diameter pipe when the pipe holding device holds the pipes,
 the first member is adapted to be fixed to the large diameter pipe,
 the first member and the second member are adapted to grip the small diameter pipe,
 the metal surfaces of at least one of the first member and the second member are adapted to directly hold the small diameter pipe, and
 the resin surface of the resin member is shaped such that, when clamping of the small diameter pipe by the first member and the second member is released, the small diameter pipe is held only by the resin surface of the resin member.

2. The pipe holding device of claim 1, wherein the resin member is located such that the metal surfaces are located between the resin surface and an end of the large diameter pipe, when the pipe holding device holds the pipes.

3. The pipe holding device of claim 1, wherein the resin member is one of a pair of resin members, and the metal surfaces are located between the resin members.

4. The pipe holding device of claim 1, wherein:
 the metallic member and the resin member have a holding hole that is adapted to receive the small diameter pipe; and
 an inner peripheral surface of the holding hole of the metallic member is located on the same cylindrical surface as an inner peripheral surface of the holding hole of the resin member.

5. The pipe holding device of claim 1, wherein:
 the resin member includes an annular portion sized to be fitted to the outer peripheral surface of the small diameter pipe; and
 the metallic member includes an annular portion sized to be fitted to the outer peripheral surface of the resin member.

6. The pipe holding device of claim 5, wherein:
 the second member is pivotally coupled with the first member;
 the pipe holding device is further provided with a fastening member; and
 the first member and the second member are adapted to grip the small diameter pipe, by applying force to the second member in the direction of the first member with the fastening member.

7. The pipe holding device of claim 6, wherein:
 the resin member has a cylindrical body and a protruding portion, which protrudes in a direction perpendicular to an axis of the cylindrical body from an outer peripheral surface of the cylindrical body; and
 the metallic member has a groove engaged with the protruding portion.

8. The pipe holding device of claim 7, wherein the resin member further includes a flange, which is located oppositely to the protruding portion, on the outer peripheral surface of the cylindrical body, and the flange contacts an end surface of the annular portion of the metallic member.

9. The pipe holding device of claim 8, wherein the flange is located between the end surface of the annular portion of the metallic member and an end surface of the second member when the second member is being urged toward the first member.

10. The pipe holding device of claim 1, further comprising:
 a cylindrical guide member that is located between an inner peripheral surface of the large diameter pipe and the outer peripheral surface of the small diameter pipe, when the pipe holding device holds the pipes.

11. The pipe holding device of claim 1, wherein the resin member is one of an upper resin member and a lower resin member.

12. The pipe holding device of claim 1, wherein the resin member is a single, unitary member.

13. The pipe holding device of claim 12, wherein the resin member is formed integrally with a guide member.

14. The pipe holding device of claim 12, wherein the resin member has an upper annular portion and a lower annular portion, and the metal surfaces are located between the upper annular portion and the lower annular portion.

* * * * *